Feb. 26, 1957

L. D. HINDALL 2,783,455

SELF SYNCHRONOUS DELAY LINE

Filed July 5, 1955

INVENTOR:
Lawrence D. Hindall, deceased
by Paul Grim, Administrator
By Herbert E. Metcalf
His Patent Attorney United States Patent Office 2,783,455

Patented Feb. 26, 1957

2,783,455

SELF SYNCHRONOUS DELAY LINE

Lawrence D. Hindall, deceased, late of Montecito, Calif., by Paul Grimm, administrator, Santa Barbara, Calif., assignor to Northrop Aircraft, Inc., Hawthorne, Calif., a corporation of California Application July 5, 1955, Serial No. 519,946

7 Claims. (Cl. 340—173)

This application is a continuation-in-part of the parent application of Hindall, Serial No. 233,422, filed June 25, 1951, now abandoned.

This invention relates to a self synchronous delay line system, and more particularly to a means and method of attaining circuit synchronism in a mercury delay line, for example, maintained as an effective memory device in a changing temperature range such as may be encountered in normal room temperature variations.

The memory system of an electronic type mathematical computer uses one or more delay lines. The delay system usually used makes use of the fact that ultrasonic waves in liquids travel much slower than electrical waves in electrical conducting media. The liquid used is generally mercury, and the information to be stored is originally in the form of electrical pulses.

The conversion of the electrical pulses to ultrasonic waves is conveniently done by the use of an X-cut quartz crystal mounted on one end of a delay line, usually a column of mercury in a tube with another exactly similar crystal exposed to the mercury at the other end of the tube. One of these crystals is electrically vibrated to set up sound waves in the mercury column, and the other crystal is used to convert the ultrasonic pulses back into electrical pulses.

Ordinarily a mercury delay line is maintained in a temperature regulation oven. The input pulses are applied at one end of the line and are converted into ultrasonic pulses by the first crystal. These pulses travel until they strike the other crystal which converts the ultrasonic pulses back into electrical pulses. By means of this delay line, a train of pulses can be delayed for a time interval longer than the duration of the train. The pulses are usually next amplified by an amplifier and routed back to the input of the delay line. The pulses are thus kept in circulation for an indefinite length of time and can be taken out when required. However, it may be noted that a given group of consecutive pulses is not, in general, available immediately when desired, since they must first travel the length of the delay line.

In order to prevent the pulses from deteriorating completely in wave form as a cumulative effect because of successive passages through the delay unit, an electronic gate circuit is used to control the passage into the delay line of clock pulses from a continuously running pulse generator or clock source, in the presently known delay line memories. Each time a pulse appears at the output of the delay unit, a clock pulse is allowed to pass (gated) into the input of the delay line. The result is exactly the same as if the pulses were circulating continuously but are renewed at each passage, and there is no deterioration of shape.

However, the operational characteristics of both the crystals and the mercury are changed by temperature changes. Proper operation of the memory in the conventional system requires the clock pulse frequency and the mercury delay time to be in exact synchronism. In consequence, the delay lines themselves are required to be temperature controlled, as by being enclosed in a temperature controlled oven of a type well known in the art which must be regulated to within the order of less than one degree centigrade of any particular temperature.

It is an object of this invention to free memory devices such as a mercury delay line, from the strict temperature limitations heretofore required to achieve proper memory synchronism. The temperature controlled ovens used to maintain constant temperature of the delay lines of the prior art can then be eliminated.

This object is attained by providing a delay line circuit in which synchronization of the pulses through a delay line operating at room temperatures is made with a packet of accurately spaced pulses from a reference pulse source, the starting time of each successive packet being controlled by a cyclic recirculating, large synchronizing pulse output from a governing one-shot multivibrator.

The invention can be more fully understood by reference to the accompanying drawings, in which.

Figure 1:
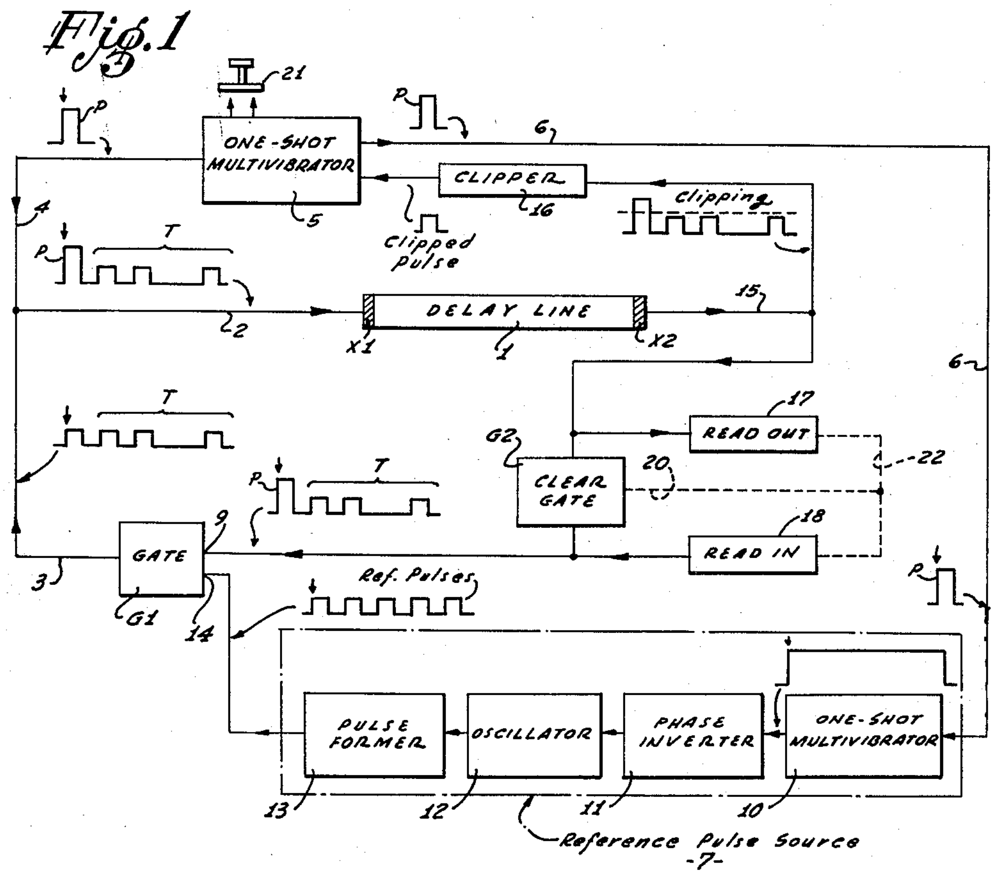
Figure 1 is a block diagram of a circuit embodying the present invention.

The present invention utilizes the circuit shown diagrammatically in Figure 1. Here a delay line 1, such as a tube filled with mercury, is provided at one end with a transmitting crystal X1 with face exposed to the mercury column and at the other end with a receiving crystal X2 similarly exposed. The transmitting crystal X1 is connected to an input line 2 and receives code pulses by gate line 3 from a gate G1, and in addition, a large synchronizing pulse output is sent to input line 2 from a one-shot multivibrator 5 through circulating line 4. A synchronizing pulse P from one-shot multivibrator 5 also simultaneously appears on pulse line 6 for purposes to be described later. Gate G1 controls the output, to the gate line 3, of a reference pulse source 7, by gating a reference pulse into gate line 3 for each code pulse appearing simultaneously at the control input 9 of gate G1.

Reference pulse source 7 is designed to produce a predetermined number of preferably square pulses at a fixed frequency, starting each time a synchronizing pulse P is received from one-shot multivibrator 5. The number of pulses produced in each "packet" or set, and their frequency, are chosen to give a definite total output period which is less than the delay time *t* of the delay line.

Reference pulse source 7 may include any apparatus suitable for performing this function, such as the units shown in Figure 1. Synchronizing pulse P on pulse line 6, from one-shot multivibrator 5, triggers a second one-shot multivibrator 10. The output from second multivibrator 10, determined by well-known circuiti time constants, is made to be a wide pulse equalling the desired reference pulse output period. The leading edge of this wide output pulse, indicated by the small vertical arrow in Figure 1, and after passing through a phase inverter 11, starts operation of a stable oscillator 12, previously held inoperative. Oscillator 12 immediately goes into operation to generate a train of reference pulses, always starting with the same phase angle of the first cycle. The trailing edge of the wide output pulse stops oscillation at the end of the reference output period, thus producing the desired number of cycles at an accurate constant frequency. The oscillator output is preferably passed through a pulse former 13 to shape up a set of square reference pulses having equal widths and constant spacing. This train of reference pulses then appears at the signal input 14 of gate G1.

Thus, the first one-shot multivibrator 5 and the reference pulse source 7 are equivalent in functions to the timer and transmitter, respectively, of a fundamental radar system. As explained hereinafter, the period or frequency of the synchronizing pulse output from one-shot multivibrator 5 will vary according to slight corresponding variation of delay time in the delay line 1.

An output line 15 from receiving crystal X2 is connected to a clipper 16 which clips all pulses at a level higher than that of the code pulses and transmits as output the synchronizing pulse portion remaining above the clipping level. The clipped pulse output from clipper 16 triggers one-shot multivibrator 5.

Output line 15 divides and also connects to a normally open clear gate G2. On the delay line side of the clear gate G2 can be connected a read-out device 17 whereby the stored pulses are read out before this gate, when desired, and new pulses can be read in by means of a read-in device 18 connected after gate G2, following clearing of the delay line 1 by means of the clear gate G2. The system is ordinarily cleared by closing clear gate G2 before reading in new code pulses. External (computer) control means of clear gate G2 is indicated by broken line 20.

The synchronizing pulse P preceding a train of code pulses T to be stored in the delay line 1 is an additional pulse provided by the one-shot multivibrator 5 and which is made substantially larger in magnitude than the code pulses. The one-shot multivibrator 5 is provided with a push button 21 used to initiate operation of the system. By momentarily depressing the push button 21, to trigger the one-shot multivibrator 5 manually, a start synchronizing pulse P is given out along pulse line 6 to trigger the reference pulse source 7 on for a given interval of time which is less than the line delay time $t$. This particular start pulse generation cycle can be to insure satisfactory functioning of the reference source 7. The large rectangular synchronizing pulse P from the one-shot multivibrator 5 is also circulated to the input of the delay line 1 by means of lines 4 and 2. Snychronizing pulse P then travels the length of the delay line 1 and is passed into the clipper 16 which clips the pulse P at a level higher than that of any code pulses. The upper portion of this synchronizing pulse P is used to automatically trigger the one-shot multivibrator 5 whose rectangular output pulse in turn again triggers the reference source 7 and is also directed into the input of the delay line 1. At the same time as the synchronizing pulse P is passed into the clipper 16, it is fed into the read-out device 17 and also through the clear gate G2 to the control input 9 of gate G1.

The synchronizing pulse P is employed by the read-out device 17 to prepare the associated computer and its well known arithmetical circuits (shown only as a dotted line 22 connecting the read-out device 17 and read-in device 18) to commence computation and operation so that code pulses, which represent the condition of the stages in a counter, for example, of the arithmetical circuits, are stepped out of the counter in the form of pulses and no pulses that can be read into the delay line circuit by the read-in device 18. Since the reference pulse source 7 is now generating, a reference pulse will be passed into gate line 3 and therefore into input line 2 for each appearance of a code pulse at control input 9 of gate G1. Synchronizing pulse P which triggered reference source 7 was simultaneously directed into circulating line 4 as previously stated; hence, the code pulses T will follow the large synchronizing pulse P at the delay line input.

It will be noted that the synchronizing pulse P appears at gate G1 simultaneously with the first reference pulse from source 7. Therefore, the first reference pulse will be gated through to gate line 3, but not as a new code pulse, since it will coincide with the other synchronizing pulse P on circulating line 4. Thus, the result is merely a single synchronizing pulse P fed to input line 2, and the next pulse space following P will be the first code pulse space, which corresponds to the occurrence of the second reference pulse generated in the reference source 7. Therefore, the first reference pulse is not used as a code pulse, and any irregularity of the first oscillation cycle, if it did exist, would not impair system operation.

The pulse train read in is recirculated repeatedly and can be held in storage practically indefinitely until needed, by recycling the code pulses through the delay line 1 and the clear gate G2, thence to control electronic gate G1 by gating a new reference pulse back into the delay line 1 for each original or previous delayed code pulse. The large synchronizing rectangular pulse P is also recirculated in cyclic fashion by the clipper 16 which triggers the one-shot mutlivibrator 5 and controls the triggering of the reference source 7 such that the new code pulses of each cycle are directly related to the governing synchronizing pulse P. The pulse P can be used also to govern the beginning of each operation cycle of the computing circuits of the associated computer; that is, the computer follows the synchronizing pulse P which may vary on each cycle.

Figure 2:
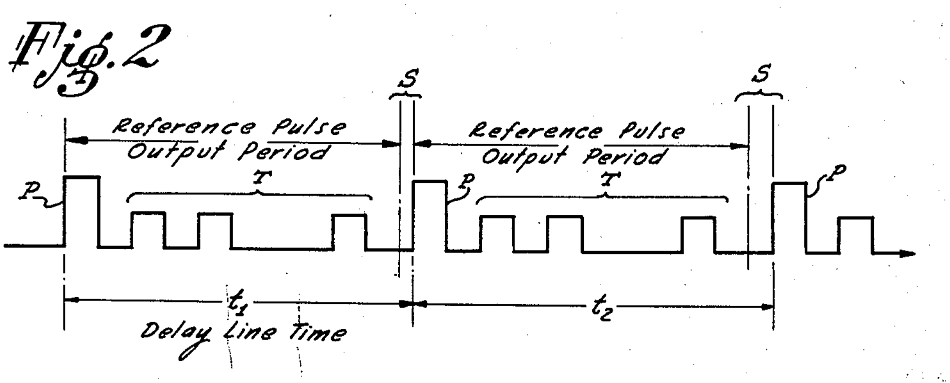
Figure 2 is a graph showing wave forms which illustrate the operation of the circuit of Figure 1.

In Figure 2, slightly more than two cycles of circulated pulses are shown. There will be a varying time spacing S between the reference pulse output period and the delay line time $t_1$, $t_2$, etc., which is purposely exaggerated in the drawing and which will occur only over a longer period of total time than shown. This will be due to the temperature coefficient of variation of velocity of sound in the delay line 1. The important feature is that each new set of code pulses T from the reference source 7 will be of the same shape and constant spacing, and will follow the preceding synchronizing pulse P at a constant time interval during the entire operation. The synchronizing pulse P provides for a self synchronous delay line memory.

The reference pulse source output period is shown and is less than the delay time $t$ of the line. It is clearly shown that the total time duration of the pulses of each set T is less than the line delay time $t$.

As the reference source is a pulse generator of stable frequency, the source is one whose starting time for each set of reference pulses is referenced to a synchronizing pulse P whose repetition rate depends on the delay of the line. The code pulses to the input of the delay line are maintained with respect to their accuracy and spacing in the system by permitting the delay line pulses to become broader and exponentially shaped thereby widening the allowable timing tolerances of delay line pulse and reference pulse coincidence at gate G1. Since the operational timing of the system, however, is referenced to the additional large synchronizing pulse P, the cyclic regeneration of the synchronizing pulse provides continuous monitoring of the system, accounting for temperature fluctuations only in the cyclic operational time bounds indicated by the appearance of synchronizing pulse P. Memory synchronism is thus accomplished even though the velocity of sound through the delay line varies.

Mercury delay lines are commonly used to hold 1,000 code pulses which can be divided, for example, into 25 groups of 40 digit numbers each, including sign and description code. In order to select any particular group, the first large synchronizing pulse P can initiate counting (in the computer, for example) of pulse groups for any cycle when desired as the code pulses enter the clear gate G2, and reading out the desired number after the correct count. Programming in the associated computer can be related to synchronizing pulse P.

Mercury delay line memories, for example, generally comprise a large number of separate channels to a single tank of mercury, each channel consisting of separate transmitting and receiving crystals mounted at each respective end of the tank. The crystals can be symmetrically arranged in two rings, for example, being mounted to equal sectors at each end of the tank thereby forming a plurality of delay line channels which are in effect separate and individual delay lines since the crystals have excellent straight-line directional properties. The temperatures of all the delay line channels are changed in exactly the same manner. Accordingly, it is to be understood that a large number of delay line channels in a delay line all can be synchronized by the use of a single clipper and a one-shot multivibrator, and that one clipper and one associated one-shot multivibrator may therefore service, if desired, a computer using a delay line having several channels requiring the same pulse spacing. Thus in actual practice, a significant saving in equipment is attained by the use of the present invention.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is, therefore, claimed in any of its forms or modifications within the legitimate and valid scope of the appended claims.

What is claimed is:

1. A self synchronous delay line memory, comprising: an ultrasonic delay line, a reference pulse source having a fixed generating output period less than the delay time of said delay line, an electronic gate connecting the output of said reference pulse source to said delay line input, means connecting said delay line output to a control element of said gate for control of gating therethrough of said reference source output to said delay line input according to the appearance of code pulses at said electronic gate control element, thereby circulating renewed code pulses at each passage through said delay line, synchronizing pulse generating means for providing a distinguishable synchronizing pulse output only when triggered by an input pulse, manual means for initially triggering said synchronizing pulse generating means, the output of said synchronizing pulse generating means connected to said delay line input, discriminating means connected between said delay line output and a trigger input of said synchronizing pulse generating means to apply an input pulse to said generating means only in response to a previous distinguishable synchronizing pulse at said delay line output, said synchronizing pulse generating means output also connected to the input of said reference source to trigger said reference source on for said fixed generating output period, thereby providing a renewed circulating synchronizing pulse followed by accurate renewed code pulses into said delay line input at each passage through said delay line, read-out means connected to said delay line output and read-in means connected to said electronic gate control element, said read-out and read-in means adapted to be connected to an associated computer.

2. Apparatus in accordance with claim 1 wherein said means connecting said delay line output to said gate control element includes a delay line clear gate, adapted to be computer controlled and normally open, to clear the system of prior existing code by closing of said clear gate.

3. Apparatus in accordance with claim 1 wherein said reference pulse source comprises a one-shot multivibrator connected to said synchronizing pulse generating means output and having a wide output pulse essentially equal in width to said fixed generating output period, an oscillator driven into oscillation as a result of said wide output pulse to produce a set number of cycles within said fixed period and stopping at the end thereof, and pulse means connected to said oscillator, the output of said pulse forming means being connected to said gate.

4. A self synchronous delay line memory, comprising: an ultrasonic delay line, a reference pulse source having a fixed generating output period less than the delay time of said delay line, an electronic gate connecting the output of said reference source to the input of said delay line, means connecting the output of said delay line to a control element of said gate for control of gating therethrough of said reference pulse source output to said delay line input according to the appearance of code pulses at said electronic gate control element, thereby circulating renewed code pulses at each passage through said delay line, synchronizing pulse generating means for providing a distinguishable synchronizing single pulse output and means for initially triggering said synchronizing pulse generating means, synchronizing pulse detecting means connecting said delay line output to a control element of said synchronizing pulse generating means to trigger said synchronizing pulse generating means to produce a new synchronizing pulse for each detected synchronizing pulse in said delay line output, means connecting said synchronizing pulse generating means output to said delay line input, thereby providing a renewed circulating synchronizing pulse at each passage through said delay line, means connecting said synchronizing pulse generating means output to said reference pulse source to trigger said reference pulse source on for said fixed generating output period and thereby providing accurate renewed code pulses through said electronic gate for previous circulating code pulses and following each said synchronizing pulse into said delay line input, read-out means connected to said delay line output, and read-in means connected to said electronic gate control element, said read-out and read-in means adapted to be connected to an associated computer.

5. Apparatus in accordance with claim 4 wherein said means connecting said delay line output to said gate control element includes a delay line clear gate, normally open and adapted to be computer controlled, to clear the system of prior existing code by closing of said clear gate.

6. Apparatus in accordance with claim 4 wherein said synchronizing pulse generating means include a one-shot multivibrator having a large amplitude rectangular pulse output, and said detecting means includes a clipper which clips all pulses at a level higher than that of said code pulses and lower than said synchronizing pulses, whereby said large synchronizing pulses are passed through said clipper to trigger said one-shot multivibrator.

7. A self synchronous delay line memory comprising an ultrasonic delay line, a reference pulse source having a fixed generating output period less than the delay time of said delay line, an electronic gate connecting said reference pulse source output to said delay line input, a normally open clear gate connecting said delay line output to a control element of said electronic gate for control of gating therethrough of reference pulses to said delay line input according to the appearance of code pulses at said electronic gate control element, thereby circulating renewed code pulses at each passage through said delay line, a one-shot multivibrator having a large amplitude synchronizing single rectangular pulse output, said one-shot multivibrator including push button means for triggering said one-shot multivibrator to produce the initial synchronizing pulse, a clipper connecting said delay line output and said one-shot multivibrator trigger element, said clipper having a clipping level higher than the amplitude of said code pulses so as not to pass said code pulses to the output of said clipper, said clipper level being lower than said large synchronizing pulse, thus passing said synchronizing pulse to trigger said one-shot multivibrator, thereby producing a new synchronizing pulse for each detected synchronizing pulse in said delay line output, said one-shot multivibrator output connected to said delay line input and also to said reference source to trigger said reference source on for said fixed generating output period, thereby providing a renewed circulating synchronizing pulse followed by accurate renewed code pulses into said delay line input at each passage through said delay line, read-out means connected to said delay line output, and read-in means connected to said electronic gate control element, said read-out and read-in means adapted to be connected to an associated computer.

References Cited in the file of this patent

UNITED STATES PATENTS

| | | |
|---|---|---|
| 2,449,467 | Goodall | Sept. 14, 1948 |
| 2,629,827 | Eckert | Feb. 24, 1953 |

FOREIGN PATENTS

| | | |
|---|---|---|
| 717,115 | Great Britain | Oct. 20, 1954 |

OTHER REFERENCES

"A Functional Description of the Edvac," Moore School of Electrical Engineering, U. of Pa. (Research Div. Report 50-9), Nov. 1, 1949, pp. 5-3 to 5-5 (Vol. I.), 7-1 to 7-8 and dwgs. 104-1La-1 and 104-7LD-1 (Vol. II).

Sharpless: "Design of Mercury Delay Lines," Electronics for November 1947, pp. 134-6, 138.

Auerbach et al.: "Mercury Delay Line Memory Using a Pulse Rate of Several Megacycles," Prog. I. R. E., August 1949, pp. 855-861.